US012579552B1

(12) United States Patent
Ma et al.

(10) Patent No.: US 12,579,552 B1
(45) Date of Patent: Mar. 17, 2026

(54) SYSTEMS AND METHODS FOR MACHINE LEARNING MODELING OF MIXED MEDIA MARKETING

(71) Applicant: Massachusetts Mutual Life Insurance Company, Springfield, MA (US)

(72) Inventors: Yuzhi Ma, Springfield, MA (US); Katie House, Springfield, MA (US); Sean D'Angelo, Springfield, MA (US); Bisakha Peskin, Springfield, MA (US); Asieh Ahani, Springfield, MA (US); Jennifer Halbleib, Springfield, MA (US); Alex Baldenko, Springfield, MA (US); Adam Fox, Springfield, MA (US); Sears Merritt, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 319 days.

(21) Appl. No.: 17/902,654

(22) Filed: Sep. 2, 2022

(51) Int. Cl.
G06Q 30/0202 (2023.01)
G06N 5/022 (2023.01)

(52) U.S. Cl.
CPC ......... G06Q 30/0202 (2013.01); G06N 5/022 (2013.01)

(58) Field of Classification Search
None
See application file for complete search history.

(56) References Cited

U.S. PATENT DOCUMENTS 10,192,225 B2    1/2019   Newman et al.
10,706,191 B2    7/2020   Sun et al.
(Continued)

FOREIGN PATENT DOCUMENTS

WO    WO-2024158424 A1 *    8/2024   ............. G06N 20/00

OTHER PUBLICATIONS

Jungwon Lee et al., "A Comparison and Interpretation of Machine Learning Algorithm for the Prediction of Online Purchase Conversion." Journal of Theoretical and Applied Electronic Commerce Research, 2021, vol. 16, pp. 1472-1491 (Year: 2021).*
(Continued)

*Primary Examiner* — Amanda Gurski
(74) *Attorney, Agent, or Firm* — Foley & Lardner LLP

(57) ABSTRACT

A system monitors impression data from a plurality of media channels including attributes of content presented on a respective media channel. The system inputs the impressions data and conversion data into a machine learning predictive model. The machine learning predictive model is trained by determining an impact of historical impression data on historical conversion data for each media channel. A machine learning predictive model incorporates an impressions/conversions predictive model that generates coefficients to measure attribution of different channel/campaign combinations to predicted conversions. The machine learning predictive model also incorporates an optimization model to effectively allocate marketing budget among various channels and campaigns in order to realize incremental conversions. The optimization model utilizes a constrained optimization framework based upon user-inputted budgets and budget constraints. Disclosed mixed media marketing predictive modeling provides a better understanding of budget allocation strategy for mixed media marketing factors.

16 Claims, 6 Drawing Sheets

(56) References Cited

U.S. PATENT DOCUMENTS

| | | | | |
|---|---|---|---|---|
| 2010/0332311 | A1* | 12/2010 | Jilk ................... | G06Q 30/0254 |
| | | | | 705/14.42 |
| 2017/0337505 | A1* | 11/2017 | Chittilappilly ......... | G06N 20/00 |
| 2019/0385189 | A1* | 12/2019 | Sheppard ................ | G06F 17/15 |
| 2022/0222594 | A1* | 7/2022 | Snyder, Jr. ......... | G06Q 30/0201 |

OTHER PUBLICATIONS

Bertsekas, Dimitri P., "Constrained Optimization and Lagrange Multiplier Methods," Academic Press, 1996, 410 pages.
Chan, David, et al., "Challenges And Opportunities In Media Mix Modelling," Google, Inc., 2017, 16 pages.
Jin, Yuxue, et al., "Bayesian Methods for Media Mix Modeling with Carryover and Shape Effects," Google, Inc., Apr. 14, 2017, 34 pages.

* cited by examiner

FIG. 3

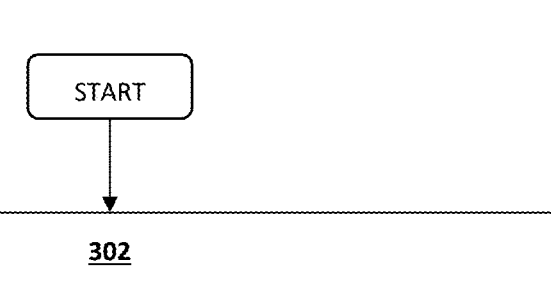

START

302

Monitor impression data from a plurality of media channels into a machine learning predictive model, the impression data including a plurality of attributes of content presented on a respective media channel

304

Input conversion data into the machine learning predictive model, wherein the machine learning predictive model is trained by determining an impact of historical impression data on historical conversion data for each media channel of the plurality of media channels

306

Execute the machine learning predictive model to determine how the conversion data corresponds to the plurality of attributes for the respective media channel to generate an attribution of the plurality of attributes for each media channel of the plurality of media channels

END

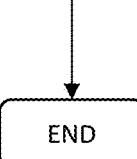

500

600

SYSTEMS AND METHODS FOR MACHINE LEARNING MODELING OF MIXED MEDIA MARKETING

TECHNICAL FIELD

The present disclosure relates to computer-automated methods for analyzing use of media channels.

BACKGROUND

Organizations attempt to communicate with customers and potential customers using multiple media channels, as the use of only one media channel may not effectively reach each customer and potential customer. The organizations may use social networks, search engine optimization, print ads, television, ads in streaming services, and other media channels. It may be difficult, however, to determine the effectiveness of each media channel. For example, a potential customer activating a link on an internet advertisement does not necessarily equate to the internet-based marketing as being the most effective channel, because an advertisement on a streaming music channel may have been effective in the conversion of that customer. Conventional system approaches may attempt measure effectiveness of each particular channel based on a response rate, but struggle to model the attribution of each media channel. As a result, it is challenging to allocate future marketing efforts to various media channels.

SUMMARY

Models for mixed media attempt to determine the impact of variations in spending in particular advertising media categories (e.g., television, online, magazine, and others) on business outcomes such as unit sales or revenues. Previous applications of computer automation tools such as machine learning predictive models to marketing mix modeling have encountered various challenges. One problem is that accurate marketing mix modeling must take into account media channels and other marketing parameters that can significantly affect predicted impacts of variations in spending in particular advertising media categories. Significant computing time and resources may be required to include a large number of media channels and other parameters as features in modeling.

One category of marketing mix modeling outputs a recommended change in the apportionment of marketing spending that, based on the predictions of the model, produces comparable results with less spending or better results with the same spending. This type of marketing mix modeling presents difficulties in reliable attribution of variations of spending in particular advertising media categories, and in optimizing variations in spending within budget constraints.

Due to the complexity of having multiple media channels, a better computer model is desired that can determine the effectiveness of the media channels in a mixed media environment and then allocate accordingly. What is desired is improved accuracy of predictive modeling that takes into account numerous advertising channels, and additional parameters that can significantly affect impacts of variations in mixed media marketing spending. What is desired is efficient predictive modeling training and performance that can efficiently handle numerous media channels and other marketing parameters. What are desired are reliable methods for attribution of mixed media marketing metrics to desired business outcomes and in optimizing variations in spending within budget constraints.

Improved methods for attribution of mixed media marketing for boosting sales conversions include a plurality of attributes of respective media channels of a plurality of media channels. Machine learning predictive modeling techniques of the disclosure yield more efficient model training and more accurate model performance by modeling media channel-campaign combinations. Disclosed embodiments provide user-friendly methods for planning marketing budget constraints, and for optimizing variations in mixed media marketing spending within the budget constraints.

Embodiments described herein aim to improve the efficiency of mixed media modeling via monitoring impression data inputted from a plurality of media channels into a machine learning predictive model. The impression data include a plurality of attributes of content presented on a respective media channel. The method inputs conversion data into the machine learning predictive model. The machine learning predictive model is trained by determining an impact of historical impression data on historical conversion data for each media channel of the plurality of media channels. The machine learning predictive model determines how the conversion data corresponds to the plurality of attributes for the respective media channel to generate an attribution of the plurality of attributes for each media channel of the plurality of media channels.

In one embodiment, a computer may monitor impression data inputted from a plurality of media channels into a machine learning predictive model. The impression data include a plurality of attributes of content presented on a respective media channel. The computer inputs conversion data into the machine learning predictive model. The machine learning predictive model is trained by determining an impact of historical impression data on historical conversion data for each media channel of the plurality of media channels. Executing the machine learning predictive model determines how the conversion data corresponds to the plurality of attributes for the respective media channel to generate an attribution of the plurality of attributes for each media channel of the plurality of media channels.

The inputted impression data may comprise attributes of content presented on respective media channels for respective campaigns. In disclosed embodiments, the inputted conversion data comprise a plurality of marketing channel-campaign combinations.

In another embodiment, a computer-implemented method may comprise monitoring, by a computer, impression data inputted from a plurality of media channels into a machine learning predictive model, the impression data including a plurality of attributes of content presented on a respective media channel; inputting, by the computer, conversion data into the machine learning predictive model, wherein the machine learning predictive model is trained by determining an impact of historical impression data on historical conversion data for each media channel of the plurality of media channels; and executing, by the computer, the machine learning predictive model to determine how the conversion data corresponds to the plurality of attributes for the respective media channel to generate an attribution of the plurality of attributes for each media channel of the plurality of media channels.

In yet another embodiment, a system may comprise an analytical engine server comprising: a mixed marketing model configured for generating conversion coefficients for a plurality of marketing channel-campaign combinations by inputting impression coefficients for a plurality of impression channel-campaign combinations into a machine learning predictive model, wherein each impression coefficient represents a respective impression value attributed to a combination of a respective impression channel and a respective marketing campaign, wherein each conversion coefficient represents a respective conversion value attributed to a combination of a respective marketing channel and a respective marketing campaign, wherein the machine learning predictive model is continually trained by inputting training data representing historical impressions and historical conversions of the enterprise; and a marketing mix optimization model configured for calculating maximum total predicted conversions by inputting the conversion coefficients for the plurality of channel-campaign coefficients received from the mixed marketing model, wherein the marketing mix optimization model applies an objective function the plurality of channel-campaign coefficients subject to one or more optimization constraints based on marketing expenditure; and further configured for determining an optimal mix of impressions to achieve the maximum total predicted conversions.

Other objects, features, and advantages of the present disclosure will become apparent with reference to the drawings and detailed description of the illustrative embodiments that follow.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 3 illustrates a flow chart of a processor-based method for generating channel/campaign attribution to boost conversions, according to an embodiment.

DETAILED DESCRIPTION

In the following detailed description, reference is made to the accompanying drawings, which depict non-limiting, illustrative embodiments of the present disclosure. Other embodiments may be utilized and logical variations, e.g., structural and/or mechanical, may be implemented without departing from the scope of the present disclosure. To avoid unnecessary detail, certain information, items, or details known to those skilled in the art may be omitted from the following.

In disclosed embodiments, a computer-based method monitors impression data inputted from a plurality of media channels into a machine learning predictive model, the impression data including a plurality of attributes of content presented on a respective media channel. The computer inputs conversion data into the machine learning predictive model. The machine learning predictive model is trained by determining an impact of historical impression data on historical conversion data for each media channel of the plurality of media channels. The machine learning predictive model determines how the conversion data corresponds to the plurality of attributes for the respective media channel to generate an attribution of the plurality of attributes for each media channel of the plurality of media channels.

In disclosed embodiments, a mixed media marketing model incorporates an optimization model to effectively allocate marketing budget among various channels and campaigns in order to realize incremental conversions. The optimization framework utilizes a Lagrangian multipliers method in a constrained optimization framework based upon user-inputted budgets and budget constraints. This optimization framework gives users a better understanding of budget allocation strategy for mixed media marketing factors.

Figure 1:
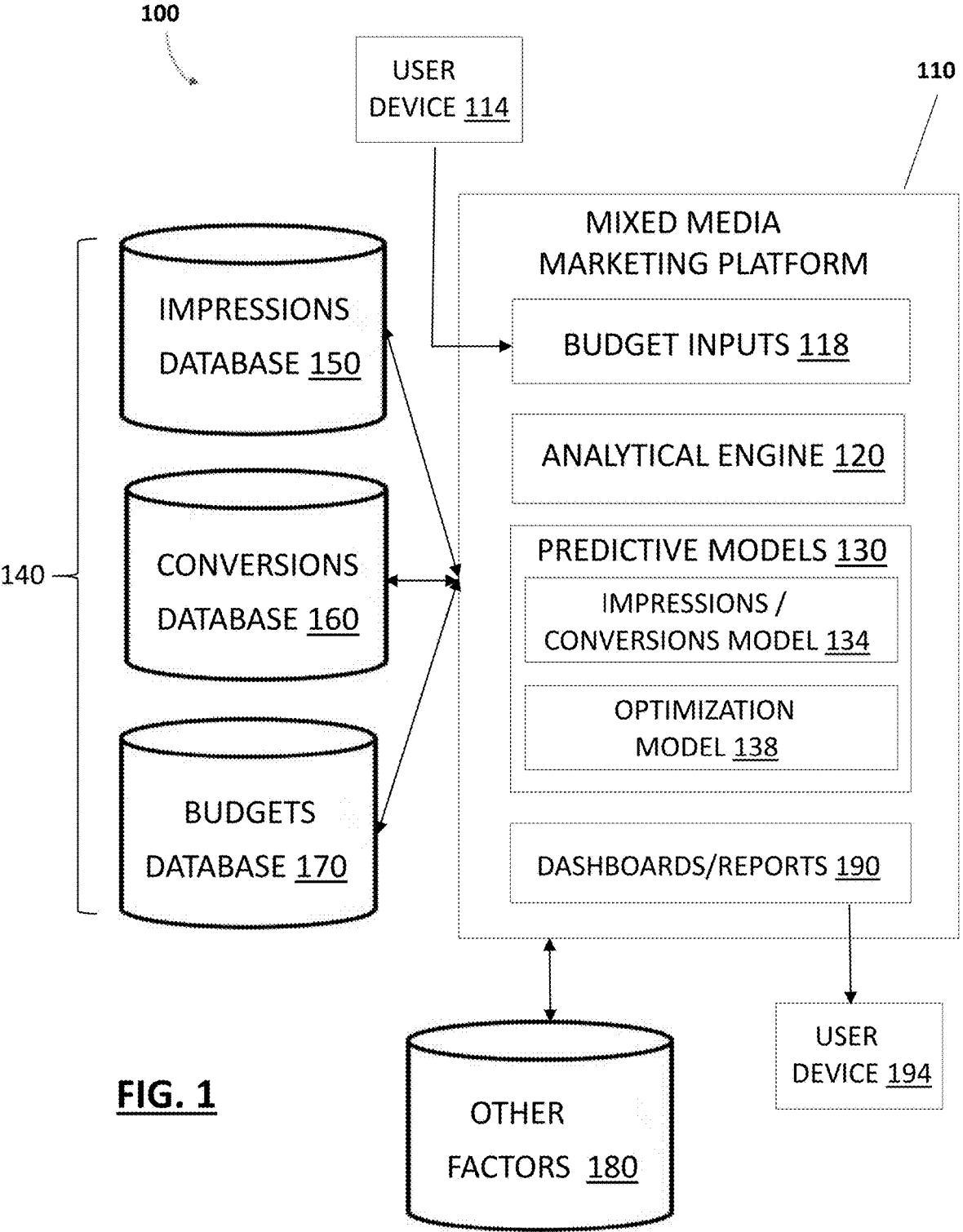
FIG. 1 illustrates a system architecture of components of a mixed media marketing system of an enterprise, according to an embodiment.

FIG. 1 shows a system architecture for a system 100 for mixed media marketing modeling. In the present disclosure, mixed media marketing is sometimes abbreviated as "MMM" and the system 100 is also herein called MMM system or MMM model. MMM system 100 may be hosted on one or more computers (or servers), and the one or more computers may include or be communicatively coupled to one or more databases. MMM system 100 can effect probabilistic predictive modeling of budget allocation strategy for mixed media marketing factors as model inputs. In various embodiments, mixed media marketing factors include MMM impressions and MMM conversions, and model inputs also may include budget data and external data. In an embodiment, MMM system 100 may be associated with a sponsoring enterprise, such as an insurance company or another financial services company. MMM system 100 may give marketers a better understanding of budget allocation strategy in order to boost total sales of products, such as insurance policies.

Mixed media marketing system 100 incorporates a MMM platform 110. Major components of MMM platform 110 include analytical engine 120 and machine learning predictive models 130. Predictive models 130 include impressions/conversions model 134 and optimization model 138. MML platform 110 is communicatively coupled to user devices 114, 194, e.g., via networks (not shown). In an embodiment, MMM platform 110 receives budget inputs 118 from user device 114. In an embodiment, MMM platform 110 generates dashboards/reports 190 that may be displayed at user device 194.

Analytical engine 120 can be executed by a server, one or more server computers, authorized client computing devices, smartphones, desktop computers, laptop computers, tablet computers, PDAs, and other types of processor-controlled devices that receive, process, and/or transmit digital data. Analytical engine 120 can be implemented using a single-processor system including one processor, or a multi-processor system including any number of suitable processors that may be employed to provide for parallel and/or sequential execution of one or more portions of the techniques described herein. Analytical engine 120 performs these operations as a result of central processing unit executing software instructions contained within a computer-readable medium, such as within memory. As used herein, a module may represent functionality (or at least a part of the functionality) performed by a server and/or a processor. For instance, different modules may represent different portion of the code executed by the analytical engine 120 to achieve the results described herein. Therefore, a single server may perform the functionality described as being performed by separate modules.

In one embodiment, the software instructions of the system are read into memory associated with the analytical engine 120 from another memory location, such as from a storage device, or from another computing device via communication interface. In this embodiment, the software instructions contained within memory instruct the analytical engine 120 to perform processes described below. Alternatively, hardwired circuitry may be used in place of, or in combination with, software instructions to implement the processes described herein. Thus, implementations described herein are not limited to any specific combinations of hardware circuitry and software.

Enterprise databases 140 consist of various databases employed by the sponsoring enterprise in MMM modeling. Enterprise databases 140 include impressions database 150, conversions database 160, and budgets database 170. Enterprise databases 140 are organized collections of data, stored in non-transitory machine-readable storage. The databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating, and/or administration of databases. The databases may conform to a well-known structural representational model, such as relational databases, object-oriented databases, or network databases. Example database management systems include MySQL, PostgreSQL, SQLite, Microsoft SQL Server, Microsoft Access, Oracle, SAP, dBASE, FoxPro, IBM DB2, LibreOffice Base, and FileMaker Pro. Example database management systems also include NoSQL databases, i.e., non-relational or distributed databases that encompass various categories: key-value stores, document databases, wide-column databases, and graph databases.

Impressions database 150 stores data representing marketing efforts (e.g., marketing expenditures, also herein called "spend") that have been put into a specific marketing channel and campaign. In an embodiment, impressions data stores impression data collected from various media channels. In an embodiment, impressions data include various attributes such as timestamp, geolocation, channel, campaign and spend information associated with impressions. In an embodiment, stored impressions data are indexed to mixed media marketing parameters such as channel and campaign.

Conversions database 160 stores data on product sales and other conversion events. In an embodiment, a conversion indicates sale of a product such as an insurance policy. In an embodiment, a conversion is associated with a product sale at a specific timestamp in a specific geolocation. In an embodiment, conversions data include various attributes such as timestamp, geolocation, product, line of business, whether the product is purchased by a new or existing customer, and associated revenue (e.g., premium for an insurance policy). In an embodiment, stored conversions data are indexed to mixed media marketing parameters such as channel and campaign.

Budgets database 170 stores data provided by users (e.g., marketing stakeholders) for budgets and bounds for the budgets. In an embodiment, stored budgets data include budgets for financial periods, such as quarterly and annual budgets. In an embodiment, stored budgets data include budgeting constraints such as bounds for the budgets. In an embodiment, stored budgets data are indexed to mixed media marketing parameters such as channel and campaign.

In addition to enterprise databases 140, MMM platform 110 receives data on other factors 180. In the present disclosure, other factors, refers to a variable whose value is determined outside the MMM model and is imposed on the model. In various embodiments, other factors are used by the MMM model to determine potential sales that are not affected by marketing efforts. In various embodiments, other factors 180 include variables such as seasonality, customer, customer value, agent score, awareness, consideration, affinity, consumer confidence index (CCI), consumer price index (CPI), gasoline price, and unemployment rate.

The impressions/conversions model 134 predicts the total number of predicted conversions due to marketing impressions. In an embodiment, impressions/conversions model 134 applies linear regression techniques in predicting total number of conversions. In an embodiment, the impressions/conversions model 134 model was trained on historical impressions and conversions data. Model coefficients from the impressions/conversions model 134 form an objective function in the optimization model 138. User device(s) 114 provide budgets data 118, such as quarterly budgets and bounds for the budgets. These budgets data feed into budget constraints of the optimization model 138. The optimization model 138 finds the optimal impressions to maximize conversions (e.g., quarterly conversions). In an embodiment, optimization model 138 uses the cost per impression to generate reports 190 on optimal spend.

Figure 2:
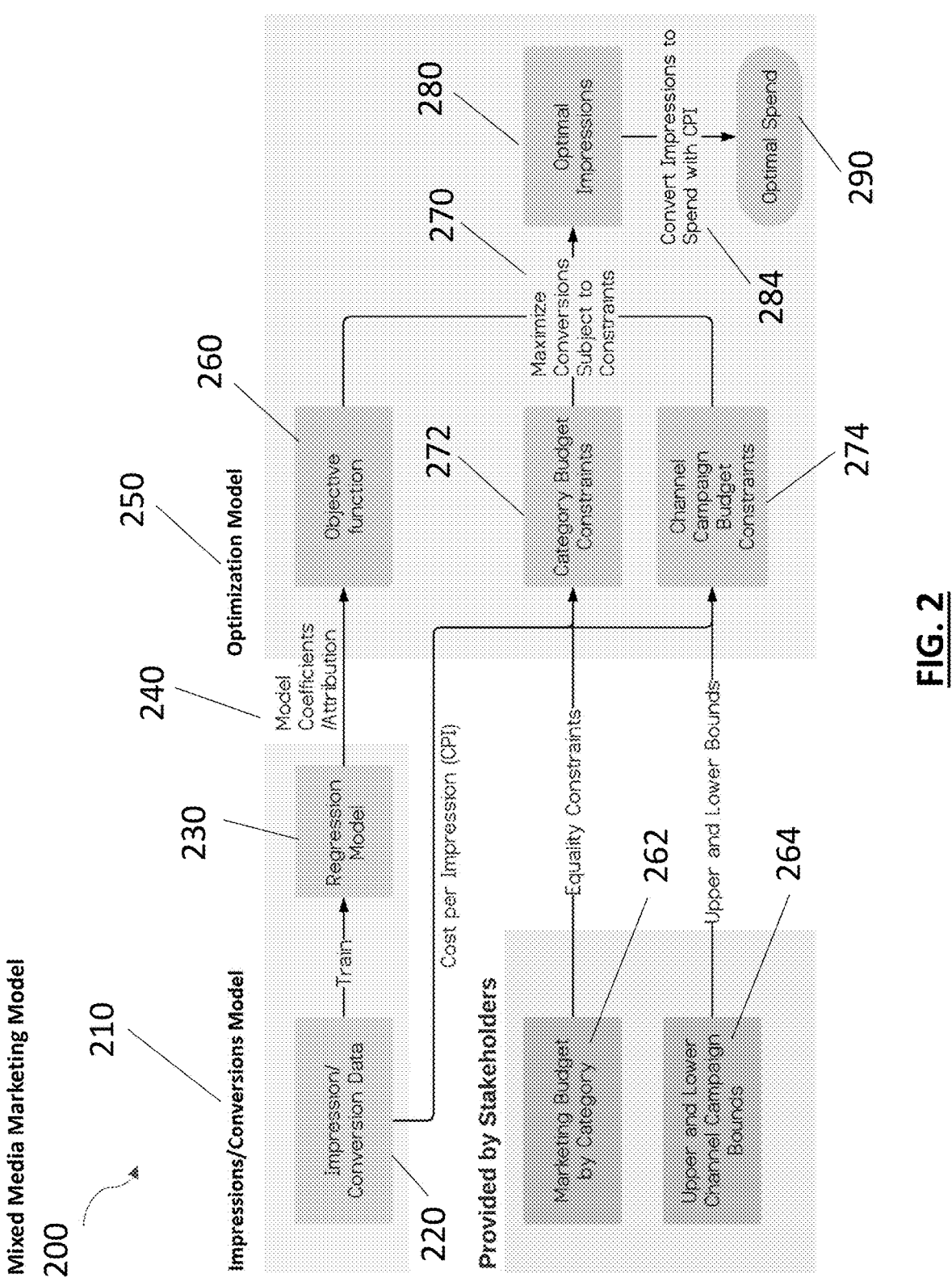
FIG. 2 illustrates an architecture of a mixed media marketing model, according to an embodiment.

FIG. 2 illustrates an architecture of a Mixed Media Marketing model 200. MMM 200 provides an optimization framework that maximizes total conversions by re-allocating marketing efforts under certain constraints. In the present disclosure, such marketing efforts are sometimes referred as spend, denoting expenditures within a marketing budget. Major components of Mixed Media Marketing model 200 include Impressions/Conversions model 210 and Optimization model 250.

In an embodiment, Impressions/Conversions model 210 models impressions to predict conversions for various channel-campaign combinations or attributions 240. Model coefficients/attributions 240 output by regression model 230 form the objective function 260 in the optimization model 250. In an embodiment, coefficients/attributions 240 may include geography in channel-campaign-geography combinations. In an embodiment, a linear regression model 230 applies a regression equation to calculate total number of predicted conversions due to marketing impressions. In an embodiment, regression model 230 of impressions/conversions model 210 is trained on historical impression data and historical conversion data 220.

In an embodiment, model training builds the Impressions/Conversions model 210 on parameter level (line of business, campaign, state) in input combinations of impressions and transforms the model coefficients to the combination level in output combinations of conversions. This transformation may avoid a dimensionality problem due to a large number of combinations (e.g., 20×5×50=5000) in including all parameters as features in the model.

In an example, impressions/conversions model 210 was trained on different input combinations of impressions (channel, campaign, state) to predict output combinations (line of business, customer, state) of conversions.

In an embodiment, the Optimization model 250 applies a variation of the power model called the multiplicative model, as shown in the following formula. This formula models a convex shape of marketing response curve.

$$y = e^{\beta_0} \prod_{i=1}^{I} x_i^{\beta_i} \qquad (1)$$

Equation (1) is the general multiplicative form of the Marketing Mix Model regression equation. The optimization model 250 applies the multiplicative model to maximize total conversions in the objective function 260 as part of an optimization algorithm to find the optimal impressions and spend.

Users such as marketing stakeholders provide inputs 262, 264 that feed into optimization constraints 270 of optimization model 250. Users provide data on marketing budget by category 262, which serve as equality constraints in Legrangian analysis to define category budget constraints 272 (e.g., quarterly category budgets). Marketing stakeholders provide upper and lower channel/campaign bounds 264, which are input to optimization model 250 to define bounds for channel campaign budgets 274.

In an embodiment, optimization constraints include some or all of Total Budget constraint, Categorical Budget constraint, Upper Channel Campaign Bound Budget constraint, Lower Channel Campaign Bound Budget constraint, and Impressions constraint.

The optimization model 250 finds the optimal impressions 280 to maximize quarterly conversions. In an embodiment, given various budget constraints, the optimization model may apply different scenarios in running the optimization. In an embodiment, optimization scenarios include Optimizing only on Total Budget; and Optimizing on all Constraints. In an embodiment, the model uses the metric cost per impression 284 to report on optimal spend 290.

FIG. 3 shows execution steps of a computer-based method 300 for generating mixed media marketing channel attribution to boost conversions, and for optimizing fractional marketing expenditures within budget constraints. The illustrative method 300 comprises execution steps 302, 304, and 306. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another.

In various embodiments of the method 300, a computer monitors impression data inputted from a plurality of media channels into a machine learning predictive model, the impression data including a plurality of attributes of content presented on a respective media channel. The computer inputs conversion data into the machine learning predictive model. The machine learning predictive model is trained by determining an impact of historical impression data on historical conversion data for each media channel of the plurality of media channels. Executing the machine learning predictive model determines how the conversion data corresponds to the plurality of attributes for the respective media channel to generate an attribution of the plurality of attributes for each media channel of the plurality of media channels.

At step 302, the computer monitors impression data inputted from a plurality of media channels into a machine learning predictive model. The impression data include a plurality of attributes of content presented on a respective media channel. In an embodiment, the inputted impression data include a plurality of attributes of content presented on the respective media channel for a respective campaign.

At step 304, the computer inputs conversion data into the machine learning predictive model. In an embodiment of step 304, the inputted conversion data comprise a plurality of marketing channel-campaign combinations. In an embodiment, inputted conversion data may include geography in channel-campaign-geography combinations. In an example, conversion indicates that a product such as an insurance policy has been sold at a specific timestamp in a specific geolocation.

In an embodiment of step 304, the machine learning predictive model is trained by determining an impact of historical impression data on historical conversion data for each media channel of the plurality of media channels. In an embodiment, the machine learning predictive model is trained on a plurality of attributes of the historical impression data to determine model coefficients for a plurality of marketing channel-campaign combinations of the historical conversion data. In an embodiment, the model coefficients represent respective conversion values for the plurality of the marketing channel-campaign combinations of the historical conversion data.

In an embodiment of step 304, the machine learning predictive model includes a linear regression model that applies a regression equation to calculate total number of predicted conversions due to marketing impressions. In an illustrative embodiment, the machine learning predictive model effects feature selection by calculating z-scores for coefficients of a non-linear model. In an illustrative embodiment, model tuning employs a greedy grid search procedure to tune model hyper-parameters.

In an embodiment of method 300, the computer further inputs a plurality of other factors into the machine learning model. The inputted other factors may be selected from the list: customer, customer value, agent score, awareness, consideration, affinity, consumer confidence index (CCI), consumer price index (CPI), gasoline price, and unemployment rate.

At step 306, the computer executes the machine learning predictive model to determine how the conversion data corresponds to the plurality of attributes for the respective media channel. The machine learning predictive model generates an attribution of the plurality of attributes of the impression data monitored at step 304 for each media channel of the plurality of media channels.

In an embodiment of step 304 in which the conversion data include a plurality of marketing channel-campaign combinations, step 306 may execute the machine learning predictive model to determine model coefficients for the plurality of marketing channel-campaign combinations.

In an embodiment of method 300, model training builds the predictive machine learning model on a parameter level in inputting combinations of impressions, and transforms model coefficients to a combination level in outputting combinations of conversions.

The method 300 may further include the step of calculating maximum total predicted conversions by inputting the conversion coefficients for a plurality of channel-campaign coefficients into an optimization model. The optimization model may apply an objective function to the plurality of channel-campaign coefficients subject to one or more optimization constraints based on marketing expenditure. In an embodiment, the optimization constraints include a marketing expenditure budget that serves as equality constraint in Legrangian analysis.

In an embodiment of method 300 in which the machine learning predictive model calculates maximum total predicted conversions by inputting conversion coefficients for a plurality of channel-campaign coefficients into an optimization model, the computer determines an optimal mix of impressions to achieve the maximum total predicted conversions based upon the attribution of the plurality of attributes for each media channel of the plurality of media channels. In an embodiment, the computer converts the optimal mix of impressions to optimal expenditures associated with the optimal mix of impressions. In an illustrative embodiment, the optimization model determines optimal impressions for the maximum total predicted conversions.

In an embodiment, the machine learning predictive model calculates the total predicted conversions during a given time period and determines the optimal mix of impressions to achieve the maximum total predicted conversions during the given time period. In an illustrative embodiment, the predictive machine learning model determines seasonality by applying time series analysis to the transformed conversion data. In an embodiment, data pre-processing transforms time series data to include delay effects and impression carry-over of advertising.

In an embodiment, the optimization model applies an objective function to maximize the total number of predicted conversions due to marketing efforts. In an embodiment, the objective function employs a multiplicative response function that models a convex shape of marketing response curve. In an embodiment, the response function includes terms for marketing mix variables that interact. In an embodiment, the objective function maximizes the total number of predicted conversions due to marketing efforts in a given time period.

In an embodiment, users provide inputs that feed into optimization constraints of the optimization model. In an embodiment, the optimization constraints may include one or both of upper bounds for total marketing expenditures associated with respective channel-campaign combinations, and lower bounds for total marketing expenditures associated with respective channel-campaign combinations. In various embodiments, the optimization model may apply different scenarios such as optimizing only on total budget and optimizing on all constraints.

In an example of method 300, the machine learning predictive model is trained to predict historical conversions from historical impressions and to generate coefficients to measure the contribution of different channel/campaign combinations. Attribution that is not assigned to a particular campaign/channel combination is allocated instead to a marketing base representing factors beyond direct control by marketing efforts. An optimization model runs the coefficients through an optimization engine that tests different spend combinations to provide guidance on allocation of spend across channels and campaigns to maximize overall conversions. The optimization model accepts budget constraints, such as minimum and maximum spend by channel/campaign, to allow users to test different marketing scenarios.

In an example of method 300, after a budget plan has been approved and activated, users may input the final budget plan (e.g., quarterly spend) to the optimization model. The optimization model may compare the final budget plan to actual conversions (e.g., one quarter later) in order to measure marketing optimization and model performance over time.

Marketing Mix Model Development:

Table 1 shows stages of a process for developing the impression/conversions model 210, also referred to herein as the marketing mix model.

TABLE 1

| Stages of Marketing Mix Model Development | | | |
| --- | --- | --- | --- |
| Stage 1 | Stage 2 | Stage 3 | Stage 4 |
| Marketing Data & Other Factors | Pre-processing | Marketing Dynamics | Model Training & Tuning |
| Impressions | Transform data | Adstock | Hyperparameter |
| Conversions | Stack impressions | Transformation | Tuning |
| Seasonality | on line of business | Conversion | Feature Selection |
| Unemployment, etc. | and state | Lag | Model Selection |

A first stage of developing the impressions/conversions model 134 and 210 is data exploration, which may incorporate a dataset including marketing data and other factors. The marketing data include impressions and conversions. The other factors include economic variables imposed on the model such as seasonality and unemployment.

Marketing mix modeling embodies sales response functions to relate the effects of marketing activities on sales. The sales response functions depict the effect of the different elements of the mix on sales. One of the most commonly used forms in marketing mix modeling is the concave shape, characterized by diminishing returns to scale as the marketing activity increases. This characteristic returns reflects the expectation that as the intensity of displays and advertising increases, the returns diminish. The MMM incorporates an impressions/conversions model that models a concave shape of marketing response curve.

In an embodiment, to model a concave shape of marketing response curve, the impressions/conversions model 210 employs a variation of the power model called the multiplicative model, as shown in formula 1 above.

By taking the logarithm of both sides of the multiplicative model, this formula is transformed to the log-linear model as shown in formula 2:

$$\log(y) = \beta_0 + \sum_{i=1}^{I} \beta_i \log(x_i) \tag{2}$$

An advantage of this transformation is that the parameters of the original nonlinear model can be estimated using linear regression techniques.

In marketing mix modeling, elements of the mix can interact synergistically to produce an effect greater than the sum of their individual effects. For example, the elements of social advertisement and search engine marketing often have a synergistic impact lifting sales more than the sum of their individual impacts on sales. Investments in marketing instruments such as theme advertising strengthen a brand's equity, resulting in the lowering of consumers' sensitivity to changes in price. These interaction effects affect the sensitivity of one or more elements of the marketing mix, to changes in another element of the mix. They are captured in response functions by including an additional term $(X_1 \times X_2)$ that is formed by the product of the two variables that interact.

Dataset: In the mixed media marketing model of the disclosure, key features of the training dataset include impressions, conversions, and other factors.

Impression is used to represent marketing efforts, or spend, that have been put into a specific marketing channel and campaign. In an embodiment, the marketing mix model incorporates impression data from around 20 channels collected from various vendors, including timestamp, geography, channel, campaign and spend information associated with impressions.

Channel impressions details are listed below in Table 2.

TABLE 2

| Channel Impressions | | |
|---|---|---|
| Variable | Type | Note |
| Week | Date | Timestamp when the impression was happening |
| Channel | Varchar | Media channel to collect impression (e.g. TV) |
| Campaign | Varchar | Marketing purpose (e.g. Brand) |
| Geography | Varchar | State/DMA where the impression was happening |
| Impression | Float | Number of impressions |
| Spend | Float | Spend associated with the impressions |

In an embodiment, definitions of impressions for each channel are listed in Table 3.

TABLE 3

| Impression Definition for each Channel | | |
|---|---|---|
| Channel | Source | Impression Definition |
| Audio Streaming | External (Ad Agency) | Listened to Enterprise (Ent) commercial from audio streaming channel such as Spotify ® and Pandora ® |
| Audio Terrestrial | External (Ad Agency) | Listened to Ent commercial from traditional radio channel |
| Cinema | External (Ad Agency) | Watched Ent commercial in cinema |
| Digital Video | External (Ad Agency) | Watched Ent commercial from video channel such as YouTube ® |
| Direct Mail | Enterprise-Internal | Direct mail has been sent |
| Display | External (Ad Agency) | View of Ent advertisement from side banner on a website |
| Email | Enterprise-Internal | Email been has received |
| Facebook ® | External (Facebook ®) | View of Ent advertisement on Facebook ® |
| GDN | External (Google ®) | View of Ent advertisement on Google ® display network |
| Instagram | External (Facebook ®) | View of Ent advertisement on Instagram ® |
| LinkedIn ® | External (LinkedIn ® API) | View of Ent advertisement on LinkedIn ® |
| Newsletter | External (Ad Agency) | View of Ent advertisement on Newsletter |
| Out of Home (OOH) | External (Ad Agency) | View of Ent advertisement on Out of Home billboard |
| Pinterest ® | External (Pinterest ®) | View of Ent advertisement on Pinterest ® |
| Print Magazine | External (Ad Agency) | View of Ent advertisement on Magazine |
| Print Newspaper | External (Ad Agency) | View of Ent advertisement on Newspaper |
| Search Engine Marketing (SEM) | External (SEM Agency) | Appeared in the paid search results |
| Search Engine Optimization (SEO) | External (Google ® API) | Appeared in the organic search results |
| Snapchat ® | External (Snapchat ®) | View of Ent advertisement on Snapchat ® |
| TV | External (Comscore) | View of Ent commercial on TV |
| Twitter ® | External (Twitter) | View of Ent advertisement on Twitter ® |

In an embodiment, conversion is defined to indicate that the policy been sold at a specific timestamp in a specific geolocation. In tracking conversions, the marketing mix model records detailed information for the conversions such as product, whether this product is purchased by a new or existing customer and associated premium for the policy. Product may be identified with a line of business.

In an example, conversion details are listed in Table 4.

TABLE 4

| Conversion Details | | |
|---|---|---|
| Variables | Type | Note |
| Issue data | Date | The date when the policy was issued |
| Major product | Varchar | Product type of the policy |
| Line of Business | Varchar | Line of business of the policy |
| Premium | Float | Premium of the policy |
| Geography | Varchar | State/Region where the owner of the policy is living |
| Customer | Varchar | Whether the customer is a new or existing customer |

Figure 4:
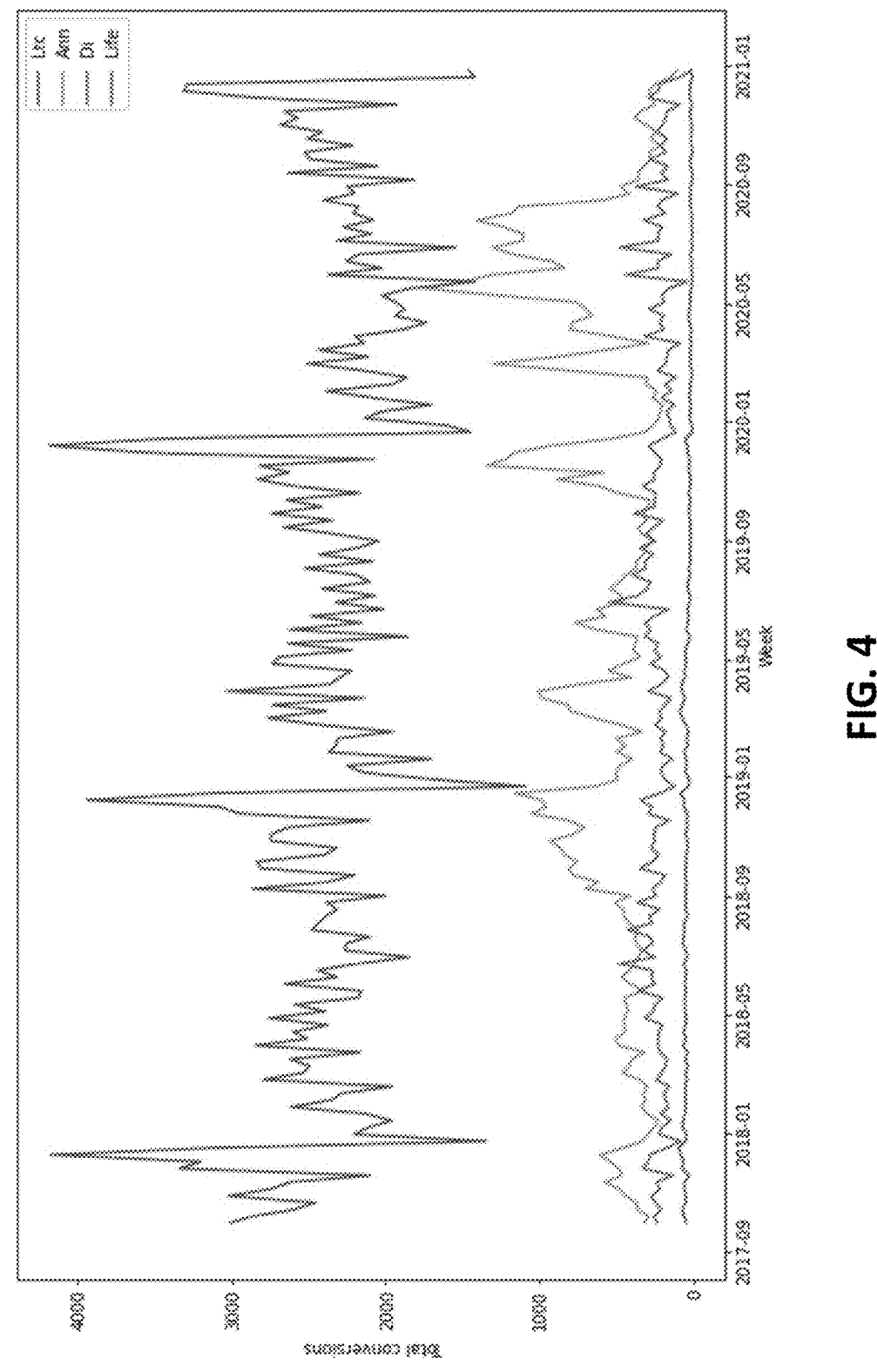
FIG. 4 illustrates a preliminary analysis of weekly number of sold policies across different line of business, according to an embodiment.

FIG. 4 illustrates a preliminary analysis of weekly number of sold policies across different line of business (line of business). Certain policies for testing purpose were excluded from the dataset for testing purposes. The analysis determined whether a customer is new or existing customer by examining that the customer is an existing customer if it had previously owned another policy, otherwise is a new customer.

In this example, the data indicated that life insurance policies are still the main category of insurance products sold by a financial services enterprise. These weekly data exhibited a clear seasonal patterns of sales. These data indicated model development should extract seasonality separately for each line of business.

To adapt the impressions/conversions regression model to predict a conversion for a given time period such as a week, the general multiplicative formula (1) may be more specifically written as formula (3). The terms of formula (3) have the meanings shown in Table 5.

$$y_{t,k} = e^{\beta_{0,k}} \prod_{i=1}^{I} x_{i,t}^{\beta_{i,k}} \qquad (3)$$

In an example of weekly conversions for each output combination C, example parameters of output combinations include life insurance (Life); annuities (Ann); in New York (NY); in California (CA); conversions for new customers (New); and conversions for current customers (Old).

F denotes other factors $F=\{f_{t,1}\}_{t=1:T,1=1:L}$. Example parameters for F include consumer price index, unemployment rate, brand health metric, and seasonality.

In an embodiment, the impressions/conversions model can be represented in the following formula:

$$C=F(M,F,\Phi,\Phi) \qquad (6)$$

In formula (6), $\Phi$ are model parameters and $\Phi$ are hyper-parameters (adstock rate, conversion lag, etc.).

Marketing Dynamics: A third stage of developing the impressions/conversions model 134 and 210 is Marketing Dynamics. In an embodiment, marketing dynamics techniques are applied as an additional pre-processing stage of model development using the wide format impression table obtained from previous Pre-processing stage. The impact of marketing efforts on sales can be felt not only at the time of the efforts, but also before or after duration of the efforts.

TABLE 5

Conversion for a Week

| Term | Meaning |
|---|---|
| i | input or channel, campaign, state where i ∈ {1, 2, . . . , I} and I is the total number of channel, campaign, state input combinations (i.e. TV, Brand, NY, SEM, Brand, CT) |
| k | output or line of business, customer, state where k ∈ {1, 2, . . . , K} and K is the total number of line of business, customer, state output combinations (i.e. Life, NY, New, Disability, CT, New) |
| t | time period for the impressions (the model was trained on weekly impressions) |
| $y_{t,k}$ | conversions for a given output combination and time period |
| $x_{i,t}$ | impressions for a given time period and input combination |
| $e^{\beta_{0,k}}$ | intercept for that output combination or the non-marketing attribution or base which represents attribution due to factors beyond marketing's direct control |
| $\beta_{i,k}$ | model coefficients for each input combination, i, and output combination, k |

To calculate the total number of conversions for a given time period $Y_t$ across all of the outputs, the model takes the summation for all outputs in the given time period:

$$Y_t = Y_{t,k=1} + Y_{t,k=2} + \ldots + y_{t,k=K} \qquad (4)$$

This gives the following equation for total conversions in time period $Y_t$:

$$Y_t = \sum_{k=1}^{K} e^{\beta_{0,k}} \prod_{i=1}^{I} x_{i,t}^{\beta_{i,k}} \qquad (5)$$

Data Pre-processing: A second stage of developing the impressions/conversions model 134 and 210 is data pre-processing. This stage may transform a long format data table into a wide format table.

In an embodiment, in modeling to obtain coefficients for each channel, campaign, state combination, the dataset is defined as $D(C,M)_{1,T}$ where C denotes conversions/sales $C=\{C_{t,k}\}_{t=1:T,k=1:K}$. $\in(1,T)$ denotes the week. k∈(1:K) denotes the conversion combination.

In an example of media M in weekly impressions for input combinations, weekly impressions include, e.g., impressions in TV for campaign 1 in TX, impressions in Social for campaign 2 in NY. M denotes media: $M=\{mt,k\}_{t=1:T,j=1:J}$ Examples include customer response in anticipation to a price adjustment, and sales dip after a promotion. Advertising campaigns take time to wear-in. After they have been aired several times they begin to wear-out. In an embodiment, at the model development stage the marketing mix model introduces mathematical techniques to capture these carry-over, lag and delay effects. These mathematical techniques may include lag and range and Adstock methods.

The conversion lag marketing dynamic effect approach finds the optimal lag (delay) and window for a moving average transformation of each channel in the impressions table. This transformation considers the delay effect and impression carry-over of advertising for each week.

Given the impressions table, $M=\{m_{t,j}\}$, where j∈{1:J} denotes channel, campaign, and state combinations, and t∈{1:T} denotes week, the moving average with range r and lag 1 for a specific media channel h∈{1:H} in the combination, j∈{1:J}, and line of business refers to line of business:

$$\text{conversion\_lag}(m_{t,j}; r_{h,lob}, l_{h,lob}) = \frac{1}{bw_{h,lob}} \sum_{i=0}^{r_{h,lob}-1} m_t - (l_{h,lob} - i), j \qquad (7)$$

In formula (7), the delay 1 can be thought of as the lag or look back week, and r as the number of weeks in the moving average sliding window.

Adstock transformation introduces carry over and decay of advertising to the impressions table. This preprocessing step models how advertising builds awareness in consumer markets that carries over every week and decays as time passes.

Adstock transformation, adstock ($m_{t,j}$, $\lambda_{h \in j,lob}$), is a recursive formula on the impressions table entries, $M=\{m_{t,j}\}$ where $t \in \{1:T\}$ denotes week and $j \in \{1:J\}$ denotes channel, campaign, and state combinations. In equation (10) the adstock rate, or decay effect, of the previous impressions is a hyperparameter $\lambda \in [0,1]$.

$$\text{adstock}(m_{t,j};\lambda_{h,line\ of\ business})=m_{t,j}+\lambda_{h,line\ of\ business}\text{adstock}(m_{t-1,j};\lambda_{h,line\ of\ business}) \quad (8)$$

Model Training and Tuning: A fourth stage of developing the impressions/conversions model 134, 210 effects various model training and tuning procedures, including hyperparameter tuning, feature selection, and modeling attribution.

Impressions/conversions model training can solve the log-linear model formula (2) using various methods.

In an embodiment, feature selection used the variance-covariance matrix of a base model (the linear version of the model with all the features under consideration). This procedure calculated significance for the coefficients of the non-linear model.

In an embodiment, model tuning employed a greedy grid search procedure to tune model hyper-parameters. First, the grid search procedure tuned the model over the range of potential lag and range values. The procedure selected the two best lag and range parameter sets using two metrics: minimum mean proportion absolute error and maximum adjusted r-squared. Then, grid search tuned all the other potential hyper-parameter values for each set of marketing dynamics parameters to choose the final best model based on these metrics.

Optimization Model Development:

Construction of mixed media marketing model 110, 200 entails development of the impressions/conversions model 210 as described above, and development of the optimization model 250. Key components of optimization model 250 require defining an objective function 260, defining algorithms 272, and 274 for constraints, and defining algorithms 270, and 284 for determining optimal impressions 280 and optimal spend 290.

Objective Function: The objective function 160 maximizes the total number of predicted conversions due to marketing efforts in a given time period (formula (4)). The optimization model finds the optimal mix of impressions $x_{i,t}$ that maximizes the conversions as shown in the following formula:

$$\max_{x \in \mathbb{R}} \sum_{k=1}^{K} \prod_{i=1}^{I} x_{i,t}^{\beta_{i,k}} \quad (9)$$

In an embodiment, in order to find gline of businessal maxima in optimization, the optimization model of the disclosure ensures that the objective function is concave. $\prod_{i=1}^{I} x_i^{\beta_i}$ is a concave function if $0 < \sum_{i=1}^{I} \beta_i < 1$. If two objective functions are both concave, the sum of these two functions will also be concave. Thus, the objective function (14) for maximizing conversions is a concave function in the optimization model.

The impressions/conversions regression model predicts conversions given impressions. In various embodiments, optimization constraints are based on marketing spend. Additionally, the output for the optimization is optimal spend. There is a relationship between spend and impressions, which varies by channel and campaign combination. MMM optimization assumes a linear relationship between spend and impressions. In the following formula, $x_{channel\_campaign}$ indicates the impressions aggregated by channel and campaign:

$$\text{CPI}_{channel\_campaign} \times x_{channel\_campaign} = \text{spend}_{channel\_campaign} \quad (10)$$

In formula (10), CPI is the cost per impression, derived as the total cost for all impressions divided by total cost as shown in formula (11):

$$CPI_{channel\_campaign} = \frac{\text{total spend}_{channel\_campaign}}{\text{total impressions}_{channel\_campaign}} \quad (11)$$

Figure 5:
FIG. 5 illustrates a chart of relationship between weekly spend and impressions for each channel and campaign combination, according to an embodiment.

The linear relationship assumption is more accurate for some channel campaign combinations than others. FIG. 5 illustrates is a chart of relationships 500 between weekly spend and impressions for each channel and campaign. In an example, historical data indicated the assumption holds better for digital channels such as Email and Instagram than non-digital channels such as TV and Audio Terrestrial.

Optimization Constraints: In an embodiment, a process for developing optimization model 250 included defining optimization constraints 270, 272, and 274. The mixed media marketing model uses Lagrangian techniques in constrained optimization to address the MMM goal of maximizing conversions due to marketing spend efforts. Marketing spend is limited to different budget constraints depending on the time period. Therefore, MMM may add various budget constraints based on business resources for a given time period in order to perform constrained optimization.

A first budget constraint used in constrained optimization in the marketing mix model of the disclosure is Total Budget Constraint. The total of spend across all channel campaign combinations equals the total budget. However, the regression model is trained on channel, campaign, state combinations. In an embodiment, the impressions are indexed in channel, campaign, state combinations but are aggregated by channel and campaign via formula (12):

$$g(x_i, h) = \begin{cases} x_i & \text{channel\_campaign\_state} \in h \\ 0 & \text{otherwise} \end{cases} \quad (12)$$

In an embodiment, Total Budget Constraint $B_t$ is calculated by taking the sum of spend for each channel and campaign combination:

$$\sum_{h=1}^{H} cpi_h \sum_{i=1}^{I} g(x_{i,t}, h) = B_t \quad (13)$$

Table 6 describes meaning of various terms of Total Budget Constraint in formula 18.

TABLE 6

Total Budget Constraint

| Term | Meaning |
| --- | --- |
| i | input combination channel, campaign, state where i ∈ {1, 2, . . . , I} and I is the total number of channel, campaign, state input combinations (e.g., TV, Brand, NY; SEM, Brand, CT) |
| h | channel campaign combination where h ∈ {1, 2, . . . , H} and H is the total number of channel campaign combinations (e.g., TV, Brand, SEM, Brand; TV, Direct, Response, . . . ) |
| $B_t$ | total budget for the current time period, t, being optimized |
| $cpi_h$ | cost per impression for each channel campaign combination h |
| $x_{i,t}$ | impressions for each channel, campaign, state in time period t |

A second budget constraint that may be used in constrained optimization in the marketing mix model is Categorical Budget Constraint. The categorical budget constraint is similar to the total budget constraint, except it is broken down by budget categories in the business.

In an embodiment, the Optimization Model A50 determines Categorical Budget Constraint using a function that maps impressions, with channel, campaign, state combinations, to budget categories:

-continued $$\sum_{h=1}^{H} cpi_h \sum_{i=1}^{I} m(x_{i,t}, CRM) = B_{CRM,t}$$

$$\sum_{h=1}^{H} cpi_h \sum_{i=1}^{I} m(x_{i,t}, \text{Search}) = B_{Search,t}$$

Table 7 describes meaning of various terms of Categorical Budget Constraint in formulas 14, 15.

TABLE 7

Categorical Budget Constraint

| Term | Meaning |
| --- | --- |
| i | input combination where i ∈ {1, 2, . . . , I} and/is the total number of channel, campaign, state input combinations (e.g., TV, Brand, NY; SEM, Brand, CT) |
| h | channel campaign combination where h ∈ {1, 2, . . . , H} and H is the total number of channel campaign combinations (e.g., TV, Brand; SEM, Brand; TV, Direct, Response, . . . ) |
| $B_{category,t}$ | category budget for a specific category and the current time period, t, being optimized |
| $cpi_h$ | cost per impression for each channel campaign combination h |
| $x_{i,t}$ | impressions for each channel, campaign, state in time period t |

$$m(x_i, \text{category}) = \begin{cases} x_i & \text{channel\_campaign\_state} \in h \text{ category} \\ 0 & \text{otherwise} \end{cases} \quad (14)$$

Figure 6:
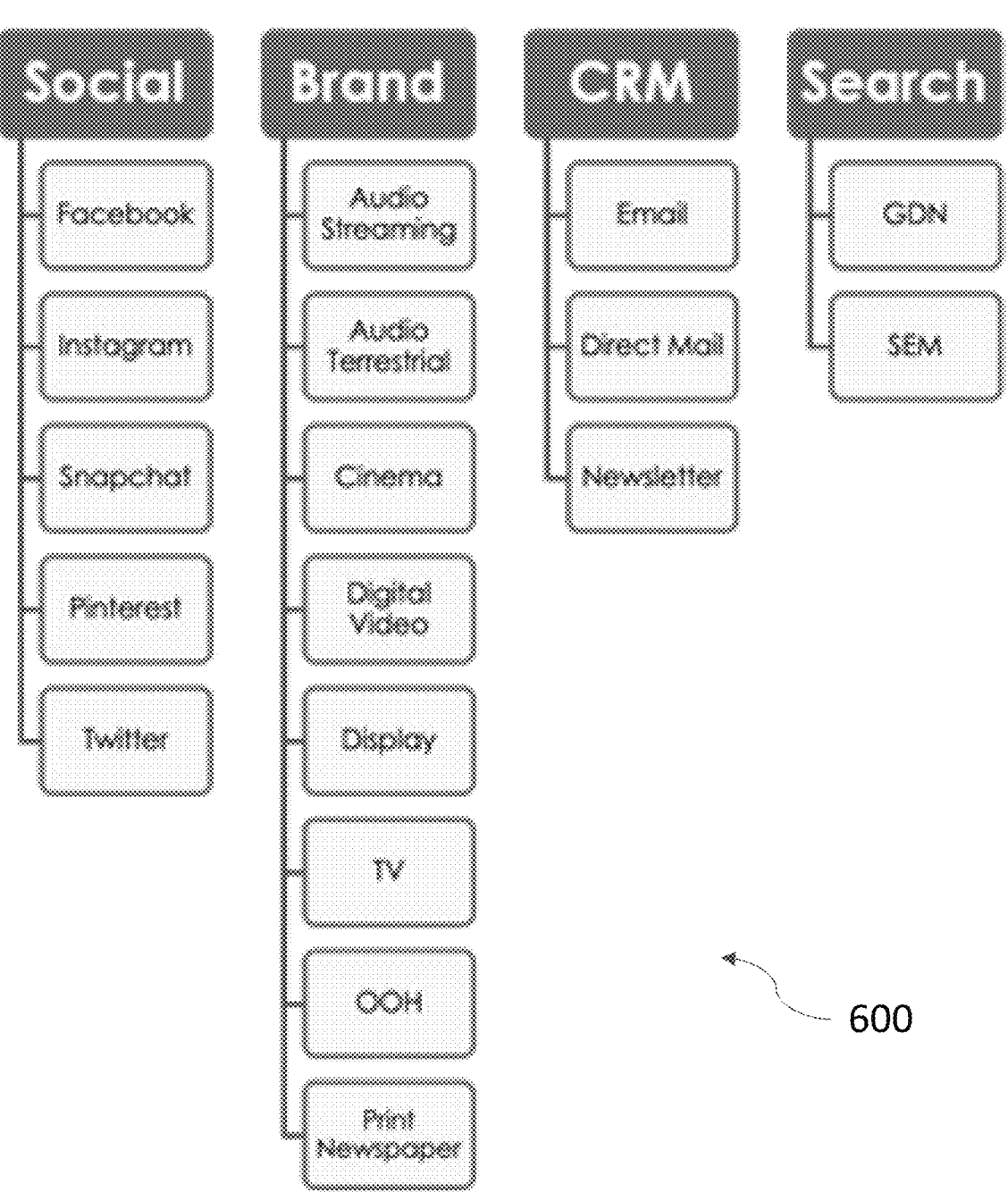
FIG. 6 illustrates a breakdown of channels into budget categories, according to an embodiment.

In an embodiment, the Categorical Budget Constraint is formulated the same as Total Budget Constraint, except it is broken down by categories in the business. In an embodiment, total marketing spend is allocated to four different categories: Social, Brand, CRM, and Search. These categories are mutually exclusive, e.g., spend allocated for Social cannot move to the Brand category. FIG. 6 illustrates a breakdown 600 of channels into budget categories. In an embodiment, spend for each channel and campaign combination in the specific category using formula (14) is aggregated to determine the total spend as shown in formulas (15):

$$\sum_{h=1}^{H} cpi_h \sum_{i=1}^{I} m(x_{i,t}, \text{Brand}) = B_{brand,t} \quad (15)$$

$$\sum_{h=1}^{H} cpi_h \sum_{i=1}^{I} m(x_{i,t}, \text{Social}) = B_{Social,t}$$

A third budget constraint that may be used in constrained optimization in the marketing mix model is Upper Channel Campaign Bound Budget Constraint. As shown in formulas (16), the sum of spend in a specific channel campaign combination must be less than or equal to an upper bound, un, for all channel campaign combinations:

$$cpi_h \sum_{i=1}^{I} g(x_{i,t}, h) \le u_h \forall h \in \{1, 2, \dots H\} \quad (16)$$

A fourth budget constraint that may be used in constrained optimization in the marketing mix model is Lower Channel Campaign Bound Budget Constraint. As shown in formulas (17), the sum of spend in a specific channel campaign combination must be greater than or equal to a lower bound In, for all channel campaign combinations.

$$cpi_h \sum_{i=1}^{I} g(x_{i,t}, h) \ge l_h \forall h \in \{1, 2, \dots H\} \quad (17)$$

19

A fifth budget constraint used in constrained optimization in the marketing mix model of the disclosure is the Impressions Constraint. As shown in formulas (18), Impressions must be greater than zero.

$$x_{i,t} > 0 \ \forall i \in \{1, 2, \dots, I\} \tag{18}$$

Optimization Summary: Given various budget constraints, there can be different methods of running an optimization. Various embodiments of the optimization model focused on two different optimization scenarios. A first optimization scenario is Optimizing only on Total Budget. In this scenario, the only constraint used in the optimization is the Total Budget Constraint, which gives the maximum conversions if spend could be allocated to any channel and campaign combination at any amount. This scenario is shown in formulas (19):

$$\max_{x \in \mathbb{R}} \sum_{k=1}^{K} \prod_{i=1}^{I} x_{i,t}^{\beta_{i,k}} \tag{19}$$

$$\text{s.t. } \sum_{h=1}^{H} cpi_h \sum_{i=1}^{I} g(x_{i,t}, h) = B_t$$

$$x_{i,t} > 0, \ \forall i \in \{1, 2, \dots, I\}$$

Table 8 describes meaning of various terms of Optimizing only on Total Budget in formulas 19.

TABLE 8

| Optimizing only on Total Budget | |
|---|---|
| Term | Meaning |
| i | input combination or channel, campaign, state where i ∈ {1, 2, . . . , I} and I is the total number of channel, campaign, state input combinations (e.g., TV, Brand, NY; SEM, Brand, CT) |
| k | output combination or line of business, customer, state where k ∈ {1, 2, . . . , K} and K is the total number of line of business, customer, state output combinations (e.g., Life, NY, New; DI, CT, New) |
| h | channel campaign combination where h ∈ {1, 2, . . . , H} and H is the total number of channel campaign combinations (e.g., TV, Brand; SEM, Brand; TV, Direct Response, . . . ) |
| $\beta_{i,k}$ | model coefficients (attribution) by input combination, i, and output combination, k |
| $B_t$ | total budget for marketing efforts for the time period, t, being optimized |
| $cpi_h$ | cost per impression for each channel campaign combination h |
| $x_{i,t}$ | impressions for each channel, campaign, state in time period t |
| $g(x_i, h)$ | $g(x_i, h) = \begin{cases} x_i & \text{channel\_campaign\_state} \in h \\ 0 & \text{otherwise} \end{cases}$ |

A second optimization scenario is Optimizing on all Constraints. In an embodiment, this scenario accounts for all constraints given by users (e.g., marketing stakeholders). This scenario is shown in formulas (20):

$$\max_{x \in \mathbb{R}} \sum_{k=1}^{K} \prod_{i=1}^{I} x_{i,t}^{\beta_{i,k}} \tag{20}$$

20

-continued $$\text{s.t. } \sum_{h=1}^{H} cpi_h \sum_{i=1}^{I} m(x_{i,t}, \text{Brand}) = B_{Brand,t}$$

$$\sum_{h=1}^{H} cpi_h \sum_{i=1}^{I} m(x_{i,t}, \text{Social}) = B_{Social,t}$$

$$\sum_{h=1}^{H} cpi_h \sum_{i=1}^{I} m(CRM) = B_{CRM,t}$$

$$\sum_{h=1}^{H} cpi_h \sum_{i=1}^{I} m(x_{i,t}, \text{Search}) = B_{Search,t}$$

$$cpi_h \sum_{i=1}^{I} g(x_{i,t}, h) \leq u_h \forall h \in \{1, 2, \dots, H\}$$

$$cpi_h \sum_{i=1}^{I} g(x_{i,t}, h) \geq l_h \forall h \in \{1, 2, \dots, H\}$$

$$x_{i,t} > 0, \ \forall h \in \{1, 2, \dots, H\}$$

Table 9 describes meaning of various terms of Optimizing on all Constraints in formulas (20).

TABLE 9

| Optimizing on all Constraints | |
|---|---|
| Term | Meaning |
| i | input combination or channel, campaign, state where i ∈ {1, 2, . . . , I} and I is the total number of channel, campaign, state input combinations (e.g., TV, Brand, NY; SEM, Brand, CT) |
| k | output combination or line of business, customer, state where k ∈ {1, 2, . . . , K} and K is the total number of line of business, customer, state output combinations (e.g., Life, NY, New; DI, CT, New) |
| h | channel campaign combination where h ∈ {1, 2, . . . is the total number of channel campaign combinations (e.g., TV, Brand; SEM, Brand; TV, Direct Response, . . . ) |
| $\beta_{i,k}$ | model coefficients (attribution) by input combination, i, and output combination, k |
| $B_{category,t}$ | category budget for a specific category and the current time period, t, being optimized |
| $cpi_h$ | cost per impression for each channel campaign combination |
| $x_{i,t}$ | impressions for each channel, campaign, state in time period t |
| $u_h$ | upper bound or maximum spend for each channel, campaign combination |
| $l_h$ | lower bound or minimum spend for each channel, campaign combination |
| $m(x_i, \text{category})$ | $m(x_i, \text{category}) = \begin{cases} x_i & \text{channel\_campaign\_state} \in h \\ 0 & \text{otherwise} \end{cases}$ |
| $g(x_i, h)$ | $g(x_i, h) = \begin{cases} x_i & \text{channel\_campaign\_state} \in h \\ 0 & \text{otherwise} \end{cases}$ |

Optimal Impressions. Optimal Spend: In an implementation example of the Optimization model 250, after defining the objective function 260 and the algorithms 272, and 274 for constraints, the Maximize Conversions module 270 used the SLSQP Optimizer function to determine the optimal impressions 280 for the maximum conversions. SLSQP Optimizer is a function in the SciPy open source Python library that utilizes Sequential Quadratic Programming (SQP) techniques in conjunction with Python NumPy arrays and matrices.

In an implementation example, Optimization model 250 converts quarterly budget data to weekly impressions to improve accuracy of optimization. In an embodiment, coefficients/attributions 240 of Impressions/Conversions model 210 are learned on weekly impressions with diminishing returns, but the Optimization reports are based on quarterly spend. Optimization with all spend at once (all impressions at once) has been observed to underestimate the total number of conversions due to a diminishing return effect. To translate quarterly spend to weekly impressions, model development applies a uniformly distributed budget and impressions method. This approach uniformly distributes spend across each fiscal quarter. By uniformly distributing spend, the optimal impressions are also uniformly distributed due to the linear relationship between spend and impressions.

This diminishing returns effect is illustrated in the following example (21). The total budget is $100,000 and two channels are being considered, TV, Brand, NY, and TV, Sponsorship, NY. Modeling applies $0.01 as cost per impression (CPI) for both TV, Brand and TV, Sponsorship. This translates to a maximum of 1,000,000 total impressions to allocate. The example assumes one output combination and two model coefficients, $\beta_{TV\_Sponsorship\_NY}=0.03$ and $\beta_{TV\_Brand\_NY}=0.04$.

Example (21) includes two potential scenarios. Both scenarios allocate a total of 400,000 impressions to TV, Sponsorship, NY and 600,000 impressions to TV, Brand, NY. However, in scenario 1 all spend is allocated to one week while in scenario 2 spend is allocated across two weeks.

given:

$B_{total}=\$100,000$ $CPI=0.1$ $$\text{impressions}_{total} = \sum_{i}^{I} x_i = \frac{\$100,000}{\$0.1} = 1,000,000$$

$\beta_{TV\_Sponsorship\_NY}=0.03$ $\beta_{TV\_Brand\_NY}=0.04$ scenario1: all spend occurs in one week $x_{TV\_Sponsorship\_NY}=400,000$ $x_{TV\_Brand\_NY}=600,000$ $\text{conversations}_{all\_spend\_1\_week}=(400,000^{0.03})(600,000_{0.04})=2.5$ scenario2: spend occurs across 2 weeks $x_{TV\_Sponsorship\_NY,week1}=200,000$ $x_{TV\_Sponsorship\_NY,week2}=200,000$ $x_{TV\_Brand\_NY,week1}=300,000$ $x_{TV\_Brand\_NY,week2}=300,000$ $$\text{conversations}_{\_spend\_2\_week}=(200,000^{0.03})(300,000^{0.04})+(200,000^{0.03})(300,000^{0.04})=4.8 \tag{21}$$

The above example illustrates that the distribution of weekly impressions throughout a quarter impacts the quarterly conversion prediction due to the diminishing returns effect.

In an implementation example, optimization model 250 converts optimal impressions to optimal spend. The output of the optimization 280 is the optimal number of impressions for each channel, campaign and state. The conversion 284 transforms this output to determine optimal spend 290 for each channel, campaign combination. First, the conversion takes the sum of optimal impressions by each channel campaign. Then, the conversion uses the cost per impression for each channel, campaign combination to derive the optimal spend from the impressions, as shown in formula (22). This procedure assumes a linear relationship between impressions and spend.

$$x*\text{channel\_campaign}=CPI*\text{channel\_campaign}\times \text{spend}*\text{channel\_campaign} \tag{22}$$

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require, or imply, that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, with it being understood that software and control hardware can be designed to implement the systems and methods based on the description here.

When implemented in software, the functions may be stored as one or more instructions or codes on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A computer-implemented method for improving multi-media content allocation comprising:

monitoring, by a computer, impression data input from a plurality of electronic communication channels into a machine learning predictive model, the impression data comprising one or more combinations of a plurality of attributes of impression content presented via one or more impression generators for each electronic communication channel of the plurality of electronic communication channels;

inputting, by the computer, conversion data comprising one or more attributes of one or more transactions corresponding to the impression content presented via the plurality of electronic communication channels and impression data into the machine learning predictive model, wherein the machine learning predictive model is trained by:

determining, based on a transformation model, an impact one or more time-based carry-over effects of one or more combinations of historical impression data on historical conversion data for each electronic communication channel of the plurality of electronic communication channels; and reducing overfitting of the machine learning predictive model by:

converting the impression data to one or more parameter features corresponding to one or more attributes of the impression content; and reducing, based on a corresponding significance of each of the one or more parameter features determined using a variance-covariance model corresponding to the one or more parameter features, a number of the one or more parameter features;

establishing, baseline values for one or more timing parameters corresponding to respective electronic communication channels, the timing parameters controlling a significance of impression data over time on predicted conversion tendencies;

executing, by the computer, the machine learning predictive model to predict model parameters for each electronic communication channel of the plurality of electronic communication channels, wherein the model parameters represent a conversion tendency for each electronic communication channel of the plurality of electronic communication channels;

updating, by the computer, the machine learning predictive model by adjusting one or more timing parameters in response to differences between the predicted conversion tendencies and actual conversions observed for corresponding recent impression content to refine weighting of prior impressions and improve accuracy of subsequent executions for allocating content selection across each electronic communication channel; and allocating, by the computer, an adjusted electronic communication channel content to each electronic communication channel of the plurality of electronic communication channels based on an optimization model that models one or more combinations of the model parameters according to an objective function and one or more optimization constraints.

2. The method of claim 1, wherein each electronic communication channel of the plurality of electronic communication channels corresponds to a respective campaign.

3. The method of claim 1, further comprising inputting, by the computer, a plurality of factors into the machine learning predictive model, wherein the plurality of factors comprise at least one of: seasonality, customer value, agent score, awareness, consideration, affinity, consumer confidence index (CCI), consumer price index (CPI), gasoline price, or unemployment rate.

4. The method of claim 1, wherein modeling one or more combinations of the model parameters according to an objective function and one or more optimization constraints generates a maximum total predicted conversions.

5. The method of claim 4, wherein the one or more optimization constraints comprise a marketing expenditure budget that serves as equality constraint in Legrangian analysis.

6. The method of claim 4, wherein the one or more optimization constraints comprise one or both of upper bounds for total marketing expenditures associated with respective electronic communication channels, and lower bounds for the total marketing expenditures associated with the respective electronic communication channels.

7. The method of claim 4, further comprising determining an optimal mix of impressions to achieve the maximum total predicted conversions based upon the model parameters for each electronic communication channel of the plurality of electronic communication channels.

8. The method of claim 7, further comprising generating the maximum total predicted conversions during a given time period and determining the optimal mix of impressions to achieve the maximum total predicted conversions during the given time period.

9. The method of claim 8, further comprising converting the optimal mix of impressions to optimal expenditures associated with the optimal mix of impressions.

10. A system for improving multi-media content allocation comprising:

an analytical engine server comprising:

a mixed marketing model configured for generating conversion parameters for a plurality of marketing channel-campaign combinations by inputting impression parameters for a plurality of impression channel-campaign combinations into a machine learning predictive model, wherein each impression parameter represents a respective impression tendency attributed to a combination of a respective impression channel and a respective marketing campaign, wherein each conversion parameter represents a respective conversion tendency attributed to a combination of a respective marketing channel and a respective marketing campaign, wherein the machine learning predictive model is continually trained by:

inputting one or more combinations of training data representing historical impressions impression data and historical conversions conversion data of an enterprise;

determining, based on a transformation model, one or more time-based carry-over effects of the historical impression data on historical conversion data for each marketing channel-campaign combination of the plurality of marketing channel-campaign combinations; and reducing overfitting of the machine learning predictive model by:

converting the impression data to one or more parameter features corresponding to one or more attributes of the impression content; and reducing, based on a corresponding significance of each of the one or more parameter features determined using a variance-covariance model corresponding to the one or more parameter features, a number of the one or more parameter features;

establishing, baseline values for one or more timing parameters corresponding to respective electronic communication channels, the timing parameters controlling a significance of impression data over time on predicted conversion tendencies;

a marketing mix optimization model configured for calculating maximum total predicted conversions by inputting the conversion parameters for the plurality of marketing channel-campaign combinations received from the mixed marketing model, wherein the marketing mix optimization model applies an objective function the plurality of marketing channel-campaign combinations subject to one or more optimization constraints based on marketing expenditure; and further configured for determining an optimal mix of impressions to achieve the maximum total predicted conversions;

wherein the machine learning predictive model is updated by adjusting one or more timing parameters in response to differences between the predicted conversion tendencies and actual conversions observed for corresponding recent impression content to refine weighting of prior impressions and improve accuracy of subsequent executions for allocating content across each electronic communication channel; and a computing system configured to adjust electronic communication channel content for each combination of the respective marketing channel and the respective marketing campaign based on the optimal mix of impressions.

11. The system of claim 10, wherein the mixed marketing model is further configured to generating inputs into the machine learning predictive model a plurality of factors comprising at least one of: seasonality, customer value, agent score, awareness, consideration, affinity, consumer confidence index (CCI), consumer price index (CPI), gasoline price, or unemployment rate.

12. The system of claim 10, wherein the machine learning predictive model comprises a linear regression model that calculates a total value of predicted conversion due to respective impression.

13. The system of claim 10, wherein the mixed marketing model is configured to calculate total predicted conversions during a given time period and to determine the optimal mix of impressions to achieve the maximum total predicted conversions during the given time period.

14. The system of claim 13, wherein the objective function maximizes total number of predicted conversions during the given time period.

15. The system of claim 10, wherein the one or more optimization constraints comprise a marketing expenditure budget that serves as equality constraint in Legrangian analysis.

16. The system of claim 10, wherein the marketing mix optimization model is further configured for converting the optimal mix of impressions to optimal expenditures associated with the optimal mix of impressions.

* * * * *